United States Patent [19]
Campbell et al.

[11] Patent Number: 5,408,065
[45] Date of Patent: Apr. 18, 1995

[54] WELDING APPARATUS AND PROCESS

[75] Inventors: Mark A. Campbell, Canton; John J. Sniezek, Dearborn Heights; Erick W. Rudaitis, Warren; Glenn M. Krcek, Sterling Heights; Alexander M. Turley, Troy; Robert I. Phillion, Washington, all of Mich.

[73] Assignee: Genral Motors Corporation, Detroit, Mich.

[21] Appl. No.: 958,823

[22] Filed: Oct. 9, 1992

[51] Int. Cl.⁶ .............................................. B23K 26/00
[52] U.S. Cl. .............................. 219/121.6; 219/121.84
[58] Field of Search ...................... 219/121.63, 121.64, 219/121.83, 121.84

[56] References Cited

U.S. PATENT DOCUMENTS

| | | | |
|---|---|---|---|
| 3,969,604 | 7/1976 | Baardsen | 219/137 |
| 4,507,540 | 3/1985 | Hamasaki | 219/121.64 |
| 4,603,089 | 7/1986 | Bampton | 428/593 |
| 4,634,832 | 1/1987 | Martyr | 219/121 |
| 4,684,779 | 8/1987 | Berlinger et al. | 219/121 |
| 4,694,136 | 9/1987 | Kasner et al. | 219/121 |
| 4,745,257 | 5/1988 | Rito et al. | 219/121 |
| 4,835,357 | 5/1989 | Schalk | 219/121 |
| 4,866,242 | 9/1989 | Martyr | 219/121 |
| 4,905,310 | 2/1990 | Ulrich | 219/121 |

FOREIGN PATENT DOCUMENTS

| | | |
|---|---|---|
| 0157913 | 1/1984 | European Pat. Off. . |
| 86-09600 | 2/1986 | France . |
| 59-133985 | 8/1984 | Japan . |
| 0255785 | 11/1986 | Japan ............................ 219/121.64 |
| 0089591 | 4/1987 | Japan ............................ 219/121.64 |

OTHER PUBLICATIONS

Welding, Brazing & Soldering, Metals Handbook Ninth Edition, vol. 6; p. 663.

*Primary Examiner*—C. L. Albritton
*Attorney, Agent, or Firm*—Anthony Luke Simon

[57] ABSTRACT

A laser welding apparatus comprises a mount attached to a laser beam delivery system and a cylinder attached to the mount. A piston having first and second piston ends and a piston body sealingly and slidably engages with the cylinder dividing the cylinder into first and second piston chambers. The piston is slidable between an extended position and a retracted position and has a central axial bore through which a supplemental wire is fed. A wire supply provides supplemental wire to the first piston end and a delivery head attached to the second piston end delivers the supplemental wire proximate to a laser beam and a work-piece.

18 Claims, 6 Drawing Sheets

WELDING APPARATUS AND PROCESS

This invention is related to the subject of United States Patent Applications, Attorney Docket Nos, G-9976 and G-10205, entitled "Beam Bender Support Unit" and "Welding Process and Apparatus," respectively, both filed concurrently with this Application, assigned to the assignee of this invention and both the disclosures of which are incorporated herein by reference.

This invention pertains to welding, and more particularly to an apparatus and process for use with laser welding.

BACKGROUND OF THE INVENTION

Use of lasers in industrial manufacturing environments has become more widespread in recent years. Industrial uses of lasers include cutting and welding. In many instances, laser welding can replace resistance spot weld or MIG weld applications while providing greater flexibility and speed.

The use of a laser to weld sheet metal parts has presented some complicated obstacles. Typically, sheet metal parts must be welded along seams one or more inches in length. When perfectly controlled surfaces are provided on sheet metal parts, laser welding of these seams has been done fairly easily. However, in more practical circumstances the surfaces of the sheet metal at the seams are not perfectly controlled. For example, there may be gaps at the seams where the two pieces of metal come together due to metal burrs, slight bends in the metal, etc. These gaps, when in excess of a few thousandths of an inch, have caused failure of the weld and rendered many sheet metal welding applications impractical.

What is desired is a method and/or apparatus for more effective laser welding of sheet metal parts.

SUMMARY OF THE INVENTION

This invention provides an apparatus that enables quality welding of sheet metal parts. The apparatus of this invention allows a robot to laser weld sheet metal parts without requiring elaborate fixtures to eliminate gaps between the two parts. The apparatus of this invention provides quality laser welding of sheet metal parts along seams of which there are gaps of 0.040 inches or more between facing surfaces of the parts.

Advantageously, the apparatus of this invention provides a wirefeed head for mounting on a robotic arm that feeds a wire into the laser weld that is used as a supplemental metal source for the weld. Advantageously, the apparatus of this invention provides feed wire to a laser weld while preventing the feed wire from becoming attached to the weld upon solidification. Advantageously, the apparatus of this invention provides, for use with a laser beam delivery robot, a compact wirefeed head that delivers a shield gas. Advantageously, the method of this invention provides improved welding of sheet metal parts.

Structurally, the apparatus of this invention comprises a cylinder attached to a robotic arm, an extendible and retractable piston comprising a shaft and a piston body mounted within the cylinder. The piston has a bore axially drilled through the piston. A wirefeed supply is mounted to one end of the piston and a wirefeed tip is mounted to the other end of the piston.

The method of this invention comprises the steps of positioning two parts in proximity of each other so that each part has a side facing the other part and a side facing away from the other part. A laser beam is applied to a side of one of the parts facing away from the other part and a wire feed device provides wire at the intersection of the laser beam and the side facing away. A relative movement is affected between the laser beam and the two parts while the wire is continuously supplied at the intersection of the laser beam and the side facing away. Once the weld is completed, the wire feed device is retracted and the laser beam is turned off, leaving a resulting weld between the two metal parts.

The apparatus and method of this invention are set forth in further detail below along with various examples thereof.

DETAILED DESCRIPTION OF THE INVENTION

Figure 1:
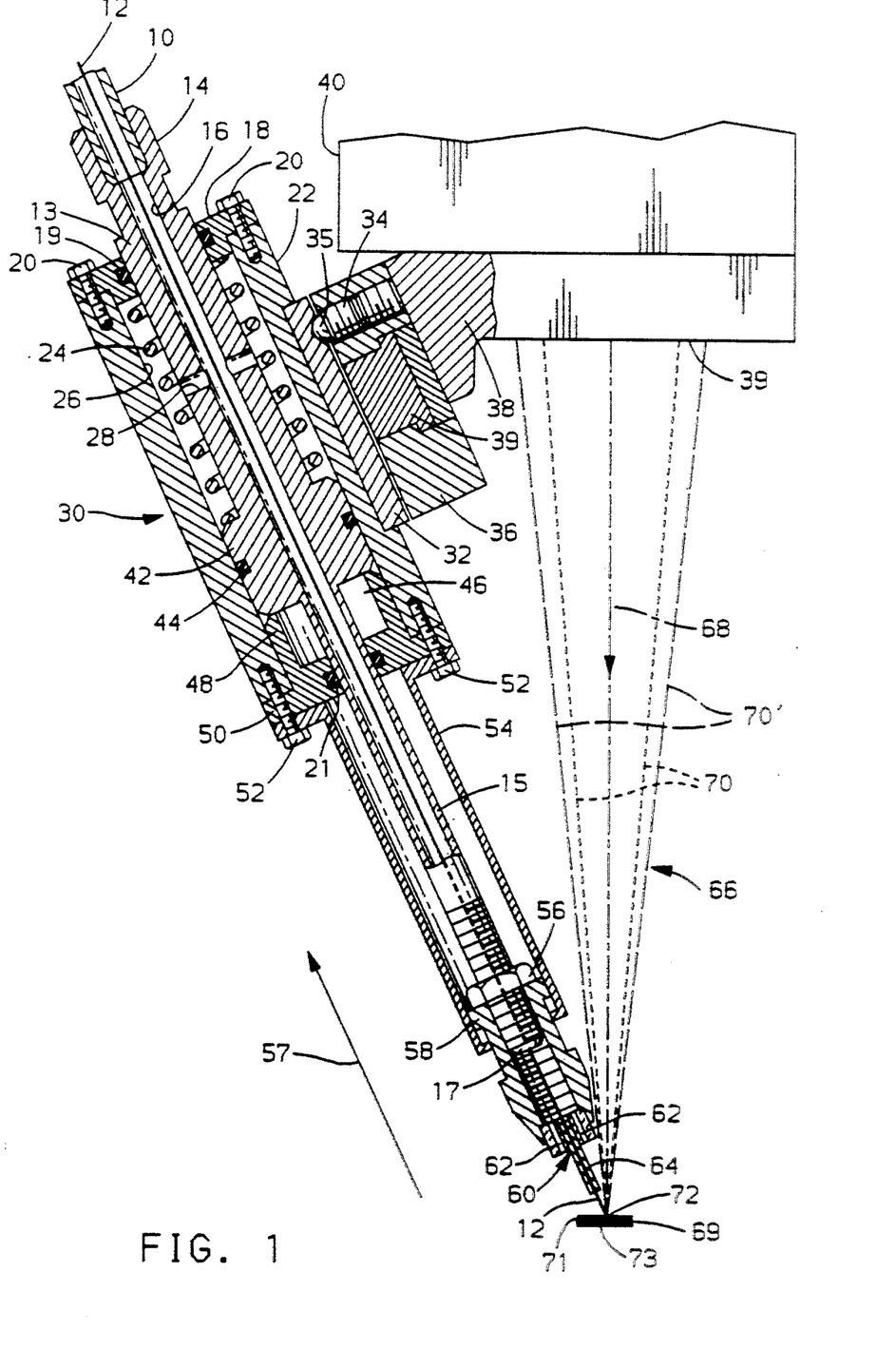
FIG. 1 is an illustration of the apparatus of this invention.

Referring to FIG. 1, reference 40 illustrates a laser delivery head of a type typically found on a laser delivery robotic arm. Within the laser delivery head 40 is a mirror (not shown) that reflects laser light onto a surface of the work-piece such as metal 71 through aperture 39 in the delivery head 40. The mirror is typically concave in shape to provide a focal point for the laser beam 66 proximate to the surface of the work-piece 71.

Attached to the laser delivery head 40, by mounts 38 and 36, is the wirefeed apparatus of this invention 30. The wirefeed apparatus 30 comprises a piston 14 mounted within a cylinder body 22 having a piston body 42 and piston rod portions 13 and 15. A hollow bore 16 is machined axially through the entire length of the piston 14. Casing 10 attached to piston 14 comprises a hollow cable through which supplemental wire 12 is delivered. Supplemental wire 12 is of a type known to those skilled in the art of MIG welding and the wire delivery systems thereof. The wire travels through the bore in piston 14 and out of the delivery end 17 to the delivery head 58 and wirefeed delivery tip 60. Wirefeed delivery tip 60 has an extended portion 64 and an axial bore 63 through which the supplemental wire is fed. Supplemental wire 12 exits the extended portion 64 and is provided at the intersection of the laser beam 66 and sheet metal 71.

The cylinder 22, along with end caps 18 and 50 attached to the cylinder 22 via suitable means such as screws 20 and 52, define first and second piston chambers 26 and 46. Within the piston chamber 26 is a compression spring 24 that biases the piston in the extended position as shown. Pressurized air is selectively supplied to piston chamber 46 to selectively force piston 14 into a retracted position, compressing spring 24 and retracting piston 14 along with the wire delivery head 58 and tip 60 in the direction of arrow 57. The piston body 42 has an O-ring seal 44, as shown, to pneumatically isolate the cylinder chambers 26 and 46. The cylinder end caps 18 and 50 are also provided with 0-ring seals 19 and 21, which pneumatically seal the cylinder chambers 26 and 46 while allowing piston 14 to extend and retract slidably within the end caps 18 and 50 as shown. Cylinder end cap 50 has a cylindrical extension 48 which acts as a stop rest for the piston body 42 when it is biased in the extended position by spring 24.

A cover 54 surrounds the portion of the piston shaft 15 close to the weld to prevent weld flash from landing on the exterior of the piston shaft 15 and causing clogging where piston shaft 15 slidably engages cylinder end 50. The cover 54 may also be attached to cylinder 22 by means such as screws 52.

The wirefeed delivery head 58 is attached to the end of piston 14 by any suitable means including threading the end of piston 14 and the internal bore of wirefeed head 58 so that the two pieces are threadably engaged together. Wirefeed delivery head 58 is positioned by jam nuts 56, which are also threadably engaged to piston 14 and are locked together in the desired position.

The wire delivery tip 60 preferably comprises a ceramic composite such as Crystaloy Series 2311 available from Industrial Ceramic Technology, Ann Arbor, Mich. The ceramic wire delivery tip 60 provides high heat resistance and is suitable for the environment of the laser weld. The ceramic wire delivery tip 60 is molded from the ceramic composite and laser machined to the shape shown to fit within the wirefeed head, where it is bonded in place therein by a high temperature adhesive of any suitable type well known to those skilled in the art. The wire delivery tip 60 has axial bore 63 through which the wire 12 is delivered and has side bores 62 through which a shield gas may be delivered.

Figure 2:
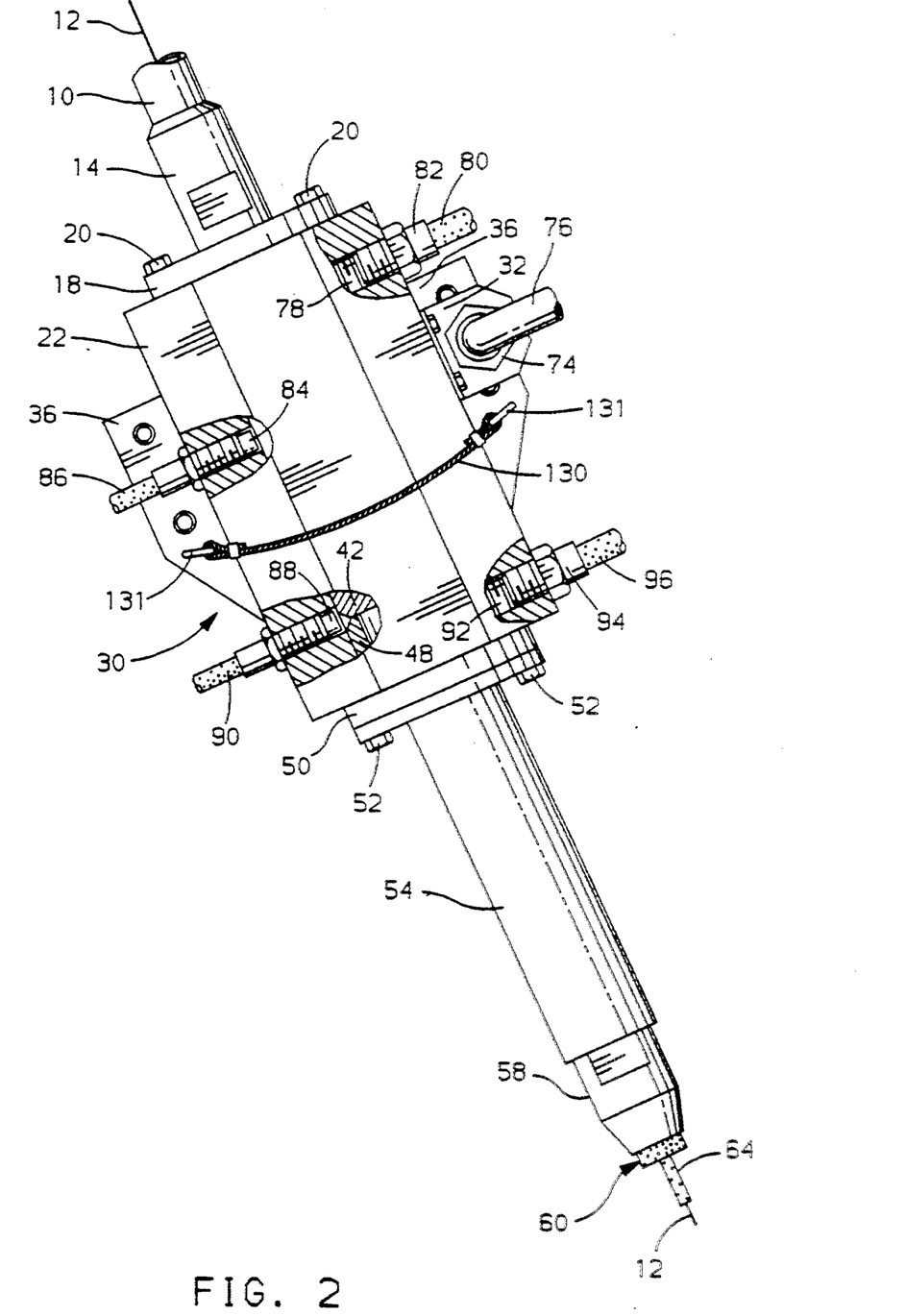
FIG. 2 is an illustration of another view of the apparatus of this invention.

Referring now to FIG. 2, a shield gas such as Helium is provided to the wirefeed apparatus 30 from a Helium supply source (not shown) through hose 80 and nozzle 82 secured to channel 78 in the wirefeed head. The Helium is provided to channel 78 at about 40 pounds/square inch pressure. The Helium flows into piston chamber 26 (FIG. 1) and through the spring 24 into transversal bore 28 in the piston 14. From bore 28, the Helium flows through the central bore 16 in the piston and takes the path of least resistance through the bore 16, to the delivery head 58 and out of the delivery vents 62 in the wire delivery tip 60. The shown structure provides a Helium flow rate of approximately 40 standard cubic feet/hour and the delivery of the Helium in the vicinity of the delivered feed wire provides a gas shield for welding operations.

Figure 3:
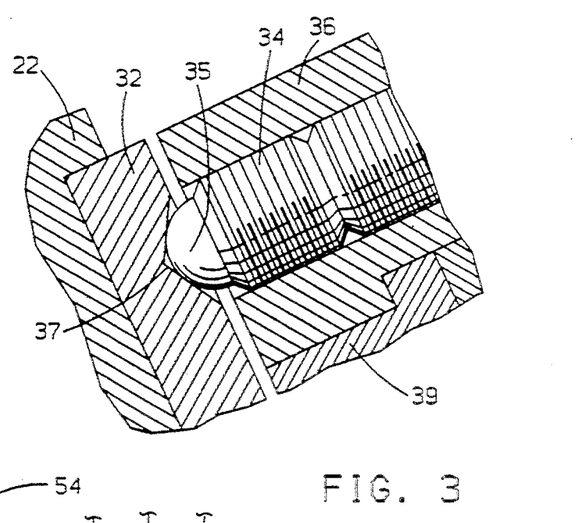
FIG. 3 is a view of a mount for use with the apparatus of this invention.

On the exterior of cylinder 22 is mounting plate 32, having a machined surface facing mount 36, in which a magnetic insert 39 (FIG. 3) is mounted for magnetically retaining the plate 32 to mounting 36. Pin 34 attached into mount 36, has a hemispheric end 35 fitting into a machined receptacle in plate 32 (See FIG. 3). The receptacle 37 and the hemispheric end 35 locate the plate 32 with respect to mount 36 so that the magnetic inserts 39 retain the two plates together at a proper and repeatable position. For strength the magnetic inserts 39 preferably comprise a rare earth magnetic substance, such magnets are readily available to and commonly known to those skilled in the art (i.e., one example thereof is sold by General Motors Corp. under the tradename Magnequench ™ and is described in U.S. Pat. No. 4,496,395).

A proximity sensor 74, powered through cable 76, senses when the plates 32 and 36 become detached, e.g., from an accidental collision of the robot. In the event of an accidental collision, the magnetic retention between plates 32 and 36 is broken so that the wirefeed apparatus 30 breaks away from the mounting plate 36 without damaging either the robot or the wirefeed apparatus 30. A cable 130 mounted to the plate 36, i.e. through a pair of eyelets 131 mounted to plate 36, loosely retains the wirefeed apparatus 30 in position in the event of a collision while not maintaining wirefeed apparatus 30 in any one rigid position, thereby avoiding damage.

Plant air (i.e., from a source of pressurized air) is provided through pneumatic hose 96 and nozzle 94, which is mounted to channel 92 in the cylinder 22. Channel 92 provides access for plant air to chamber 46 in the cylinder 22. Air control is provided through conventional pneumatic valve control so that, when plant air is provided to chamber 46 via inlet 92, piston 14 is retracted, also retracting the wirefeed delivery head 58 and ceramic wire delivery tip 60. The presence of the shield gas in piston chamber 26 does not interfere with the piston retraction because of the higher relative pressure of the plant air compared to the shield gas. Proximity sensors 84 and 88 powered through cables 86 and 90 sense when the piston body 42 is in the retracted position and in the extended position, respectively, so that feedback control of the extension and retraction of the wirefeed head 58 may be implemented.

Figure 4:
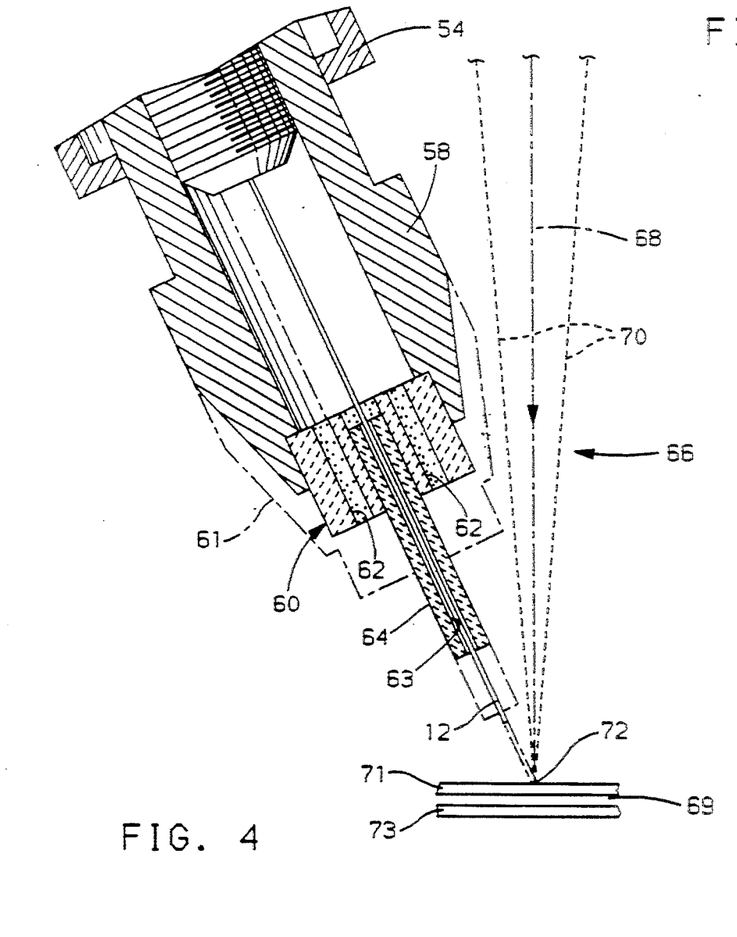
FIG. 4 shows a portion of the apparatus of this invention in a retracted position.

FIG. 4 illustrates the delivery head 58 and a portion of piston 14 in the retracted position relative to the extended position shown by dotted lines 61.

Figure 5:
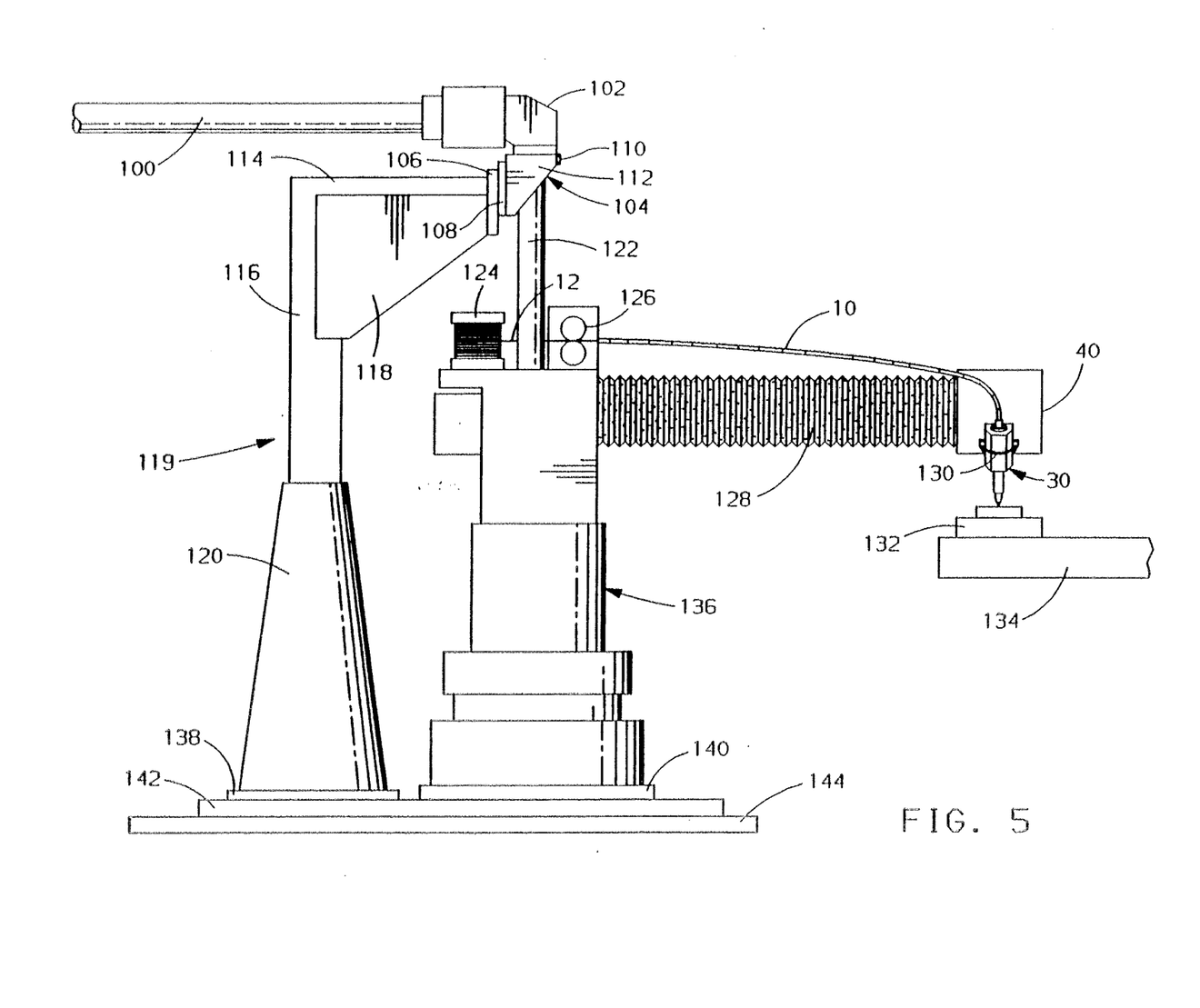
FIG. 5 is a view of a laser welding robot including the apparatus of this invention.

FIG. 5 illustrates the laser delivery robot 136 which receives a laser beam through a tube 100 from a laser generator (not shown), of a type commonly known to those skilled in the art. The laser is delivered through tube 100 to the beam bender 102, which deflects the laser beam down tube 122. Accurate positioning of beam bender 102 is critical and adjustment is provided by beam bender support 104.

Beam bender support 104 is mounted on support unit 119 comprising vertical support 116 and arm 114 with two support plates 118 (only one shown) welded on each side of the vertical support 116 and to each side of the arm 114 as shown. Two support plates 120 (only one shown) are welded to the outsides of vertical support 116 and to base plate 138. Plates 106 and 108 along with an adjustment bolt (not shown) provide vertical adjustment of the beam bender 102. Similar plates (not shown) are positioned above support plate 112 to provide horizontal adjustment of the position of beam bender 102 along two axes through rotation of two thread screws 110 (only one shown). The beam bender support is shown in more detail in the above mentioned copending application, Attorney Docket No. G-9976, entitled "Beam Bender Support Unit."

The wirefeed apparatus 30 is shown mounted on the end of robot arm 128 and receives wire 12 through cable 10 from a motorized wire delivery system 126 of a type commonly available to those skilled in the art for MIG welding. The wire supply is retained in spool 124, which is mounted to the shoulder of the robot unit 136. The cable 10 can be easily run along the robot arm 128 in a manner to avoid twisting and kinking of the cable 10.

The work-pieces to be welded may be mounted on any type of fixture such as fixture 132 and may be carried along by any type of suitable carrier including a turntable, such as turntable 134 shown. The type of work-piece fixture and carrier will vary from implementation to implementation as specific design constraints require. Both the robot 136 and the support unit 119 possess integral base plates 138 and 140, which are doweled to base plate 142 on grout support plate 144. Even with 1.5 inch steel base plate 142, care must be taken not to vary the load on the base plate 142 as varied loads on base plate 142 may cause flexing and disturb the positioning of the laser beam by the robot 136.

Figure 6:
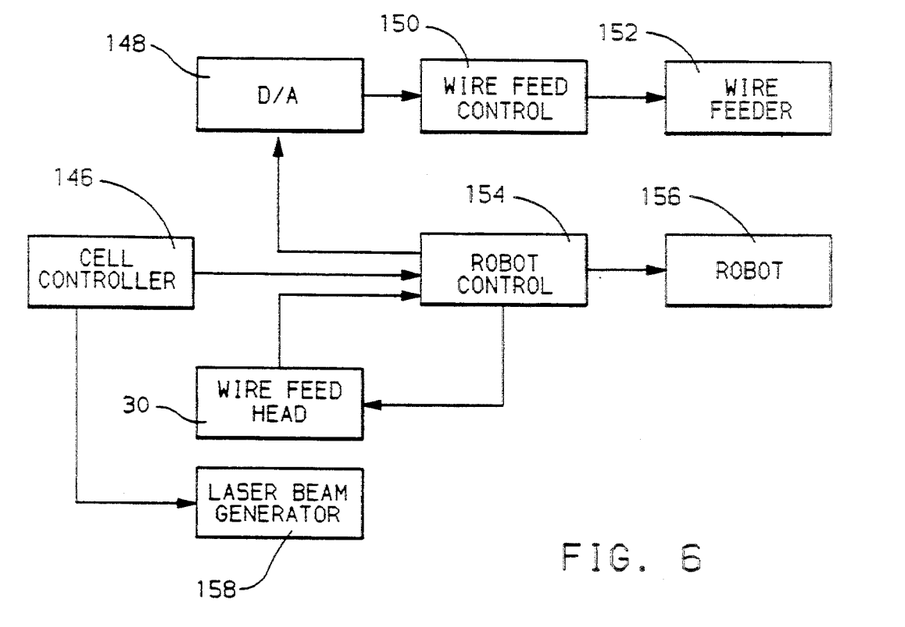
FIG. 6 illustrates a control structure for use with this invention.

FIG. 6 shows a control structure useful with this invention. The robot controller 154 is monitored by a programmable control unit 146 while it delivers commands to the wirefeed unit interface, D/A converter 148, and also controls the robot represented by box 156. Typical wirefeed units, such as unit 126 shown on FIG. 5, utilize analog controllers to control wire speed and a D/A converter 148 must be implemented to interface the robot controller 154 with the wirefeed unit represented by block 152. Control unit 146 also provides interactive programmable control of the laser beam generator represented by block 158, which generates the laser beam provided to the robot via tubes 100 and 122 and beam bender 102.

Laser beam generators useful as generator 158 are well known to those skilled in the art. For the welding applications associated with this invention a relatively high powered laser is desired. A $CO_2$ laser with a 5 kW power output or any equivalent thereto is ideal. The maximum power output of the laser may vary from implementation to implementation with system constraints such as the thickness of the pieces of metal being welded together, the gap between the pieces, the desired weld speed, the desired weld quality and the desired weld bead width.

Figure 7:
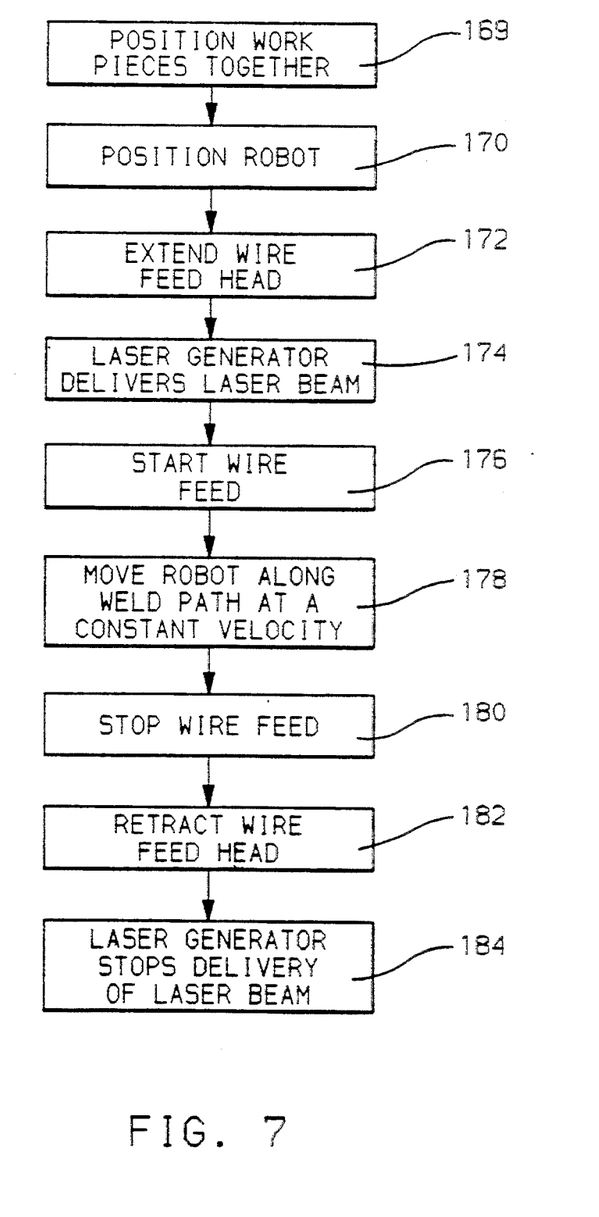
FIG. 7 illustrates the weld process of this invention.

Referring to FIG. 7, the process of this invention starts at block 169, where the work-pieces are positioned together so that portions of two sheet metal pieces are proximate to each other as shown by pieces 71,73 in FIG. 1. The sheet metal pieces 71,73 each have a side facing the other piece and each have a side facing away from the other piece. Through the process, a gap 69 may exist between the facing sides of pieces 71,73. The robot is positioned at block 170 over the start position of the weld. At block 172, the wirefeed head is extended into position so that it is in the position shown in FIG. 1. At block 174 the laser beam generator delivers a laser abeam by a command from the robot control unit 154. At block 176, the wire 12 is fed through starting of the motorized wire feeder 126 shown in FIG. 5.

The speed of the wirefeed, as controlled by motorized wire feeder 126, is preprogrammed into robot controller 154 as any one of a selectable number of wirefeed speeds and the selected wirefeed speed corresponds with the thickness of the metal pieces being welded together, the maximum anticipated gap between the work-pieces along the specific weld, and the desired width of the weld. In general, a wider weld bead corresponds to a slower velocity of the robot along the weld path, an optimal laser beam focal offset value, and a faster wire feed rate, obtainable by a faster feed speed of thin wire or use of a thicker wire. Also, corresponding to wider anticipated gaps between the work-pieces 71 and 73, more supplemental wire 12 is necessary, requiring a higher wirefeed speed and/or a thicker wire.

When the laser generator delivers the laser beam at block 174, the laser beam 66 is supplied to the side of piece 71 facing away from piece 73. As the laser impinges on work-piece 71 and intersects wire 12, the laser melts a localized area of work-piece 71 and the supplemental wire 12 and a portion of work-piece 73, so that during the temporary period when the work-pieces and the supplemental wires are melted, they flow together and solidify as a weld bead.

At block 180 when the robot has finished moving along the weld path, the wirefeed is stopped and the wirefeed head is retracted through injection of air to piston chamber 46 forcing piston 14 to compress spring 24, pulling the wire 12 away from the weld location thereby preventing the wire 12 from being solidified into the weld bead on the work-pieces 71 and 73. At block 184, the laser generator stops delivery of the laser beam, terminating the laser weld.

The process of this invention can also be used with the process described in the above mentioned copending Application, Attorney Docket No. G-10205.

Referring to FIG. 1, some advantages of this invention can be seen. The robotic arm 40 typically has a maximum load capacity and therefore the wirefeed apparatus 30 is desirably as light as possible. To achieve this lightness, cylinder 22 may be machined from aluminum and the end caps 18 and 50 and the delivery head 58 may be machined from copper, bronze or aluminum. In the configuration shown, the wirefeed apparatus 30 provides compactness enabling the flexibility in the movement of the laser delivery head 40 and allowing access to more possible weld locations by the robot.

The ceramic wirefeed tip 60 provides heat resistance to the laser weld and is shaped to avoid contact with any fringe radiation by the laser beam. The direction of the laser beam is represented by line 68 and the laser beam being focused at location 72 on the work-pieces is represented by line 70. In general, significant fringe laser beam energy is limited to 150% of the focused laser beam diameter. For example, at a point where the focused laser beam is 10.0 mm in diameter, significant fringe energy may be present within about 15.0 mm diameter area concentric with the 10.0 mm focused laser beam. As can be seen, the positioning of the wirefeed head avoids contact with the fringe energy represented by dotted lines 70', avoiding possible laser burning of the wirefeed head. Preferably, the parts of the wirefeed head are machined to tight tolerances so that the wire 12 is delivered within about 1 mm. of the center of the focal point of the laser beam.

Advantageously, the apparatus shown in FIG. 1 provides delivery of the wire with integral delivery of the shield gas through the wirefeed apparatus 30 and the ceramic tip 60. The ceramic tip 60 can be easily removed and replaced in the event it is damaged due to any cause, such as collision.

Figures 8, 9, 10:
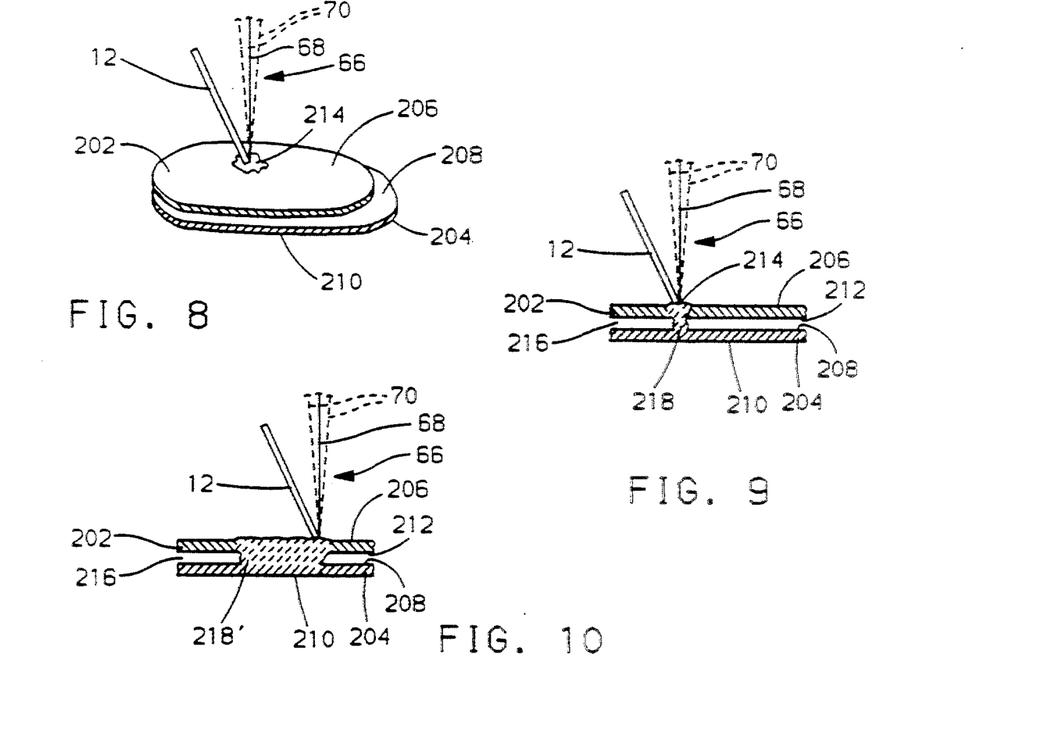
FIGS. 8, 9 and 10 graphically illustrate a laser welding process.

Referring now to FIGS. 8, 9 and 10, the welding process described above for laser welding two sheet metal parts between which there is a gap is illustrated in more detail. The two metal sheets 202 and 204 are placed in proximity of each other as shown so that each sheet 202,204 has a side 212 and 208 facing the other sheet 202,204. Each sheet 202,204 also has a facing away side 206,210 facing away from the other sheet 202,204. Typically, there will be portions of the sides 212 and 208 in contact with each other. However, unless the sides 212 and 208 are perfectly controlled or otherwise forced together, a gap 216 occurs between the two sheets 202, 204. The process shown provides a quality weld even if the gap 216 is wider than 0.040 inches.

The weld is initiated by providing a laser beam 66 and a supplemental wire 12 at a point of intersection 214 with one of the facing away sides, here side 206. When the laser beam is applied, the metal of sheet 202 in the immediate vicinity of point 214 along with part of the wire 12 become molten. As shown in FIG. 9, the molten metal and wire begin to flow together and across the gap 216 to sheet 204 causing a melting of a localized area of sheet 204. The molten metals flow together and begin to form bead 218 as shown. Relative movement of the laser beam is then affected (i.e., in the manner described above) to cause the laser beam 66 and wire 12 to move along a weld path expanding the weld bead 218 to form bead 218' as shown in FIG. 10. A shield gas is preferably provided with the process in the manner taught above or equivalent. When the complete weld path has been scanned, the wire 12 is withdrawn from the sheet 202 and the laser beam is turned off.

The speed of the welding operation is relatively rapid. For example, for two sheets of SAE 1008–1010 steel having a gap of 0.050 inches between the sheets, approximately 3 mm. wide weld beads can be achieved at a rate of 40 inches per minute and 1 mm. wide weld beads can be achieved at faster rates with a $CO_2$ laser output of 4.5 kW. The supplemental wire used may be AWS E70S-6.

Because of the speed of the welding process, only metal on sheets 202 and 204 in the immediate vicinity of the laser beam 66 melt and the bead rapidly cools as the laser is moved from the immediate vicinity.

The above examples of the apparatus and process of this invention describe the laser welding of two sheet metal parts. The apparatus and process of this invention is also useful for welding three or more work-pieces in a stack-up for lap welding. When this invention is used for welding three or more work-pieces, the stack-up of the sheet metal parts may appear similar to the two part stack-ups shown in the figures with the addition of one or more metal parts in the stack-up at the weld location. In performing the lap weld with three or more work pieces in the stack-up, the weld bead must penetrate all of the work-pieces in the stack-up, which may require increasing the power of the laser beam and/or decreasing the weld speed, depending upon the total thickness of the stack-up.

The apparatus of this invention described above can be used for improved laser weld quality for lap welds, butt welds or component welds. Variations in the laser welding process described may result in the use of a different laser generator, supplemental wire, shield gas, metal or metal joint configuration than those shown in the illustrations above to affect a desired laser weld result while falling within the scope of this invention. Moreover, various other improvements and modifications to this invention may occur to those skilled in the art and those improvements and modifications will fall within the scope of this invention as set forth below.

The embodiments of the invention in which an exclusive property or privilege is claimed are defined as follows:

1. An apparatus comprising:
   a mount;
   a cylinder attached to the mount and having first and second cylinder end caps;
   a piston having first and second piston ends, the first piston end extending out of and slidably engaged with the first cylinder end and the second piston end extending out of and slidably engaged with the second cylinder end, the piston having a piston body sealingly and slidably engaged with the cylinder dividing the cylinder into first and second piston chambers, the piston slidable between an extended position and a retracted position and having a central axial bore through which a supplemental wire travels;
   a wire supply operatively associated with the first piston end to supply the supplemental wire to the first piston end; and
   a delivery head attached to the second piston end for delivery of the supplemental wire proximate to a laser beam and a work-piece.

2. The apparatus set forth in claim 1 also comprising a spring for biasing the piston in the extended position, the spring mounted in the first piston chamber.

3. The apparatus set forth in claim 1 also comprising a means for introducing pressurized air to the second piston chamber for selectively forcing the piston to a retracted position.

4. The apparatus set forth in claim 1 wherein the wirefeed head is threadably attached to the piston.

5. The apparatus set forth in claim 1 wherein the delivery head comprises a copper piece and delivery tip comprising at least one member of a set comprising ceramic and copper.

6. The apparatus set forth in claim 1 wherein the piston includes a transversal bore in the first piston chamber.

7. The apparatus set forth in claim 6 wherein a shield gas is introduced into the first piston chamber and travels through the transversal bore into the axial bore of the piston, down the axial bore of the piston and through the wirefeed head and tip to provide the shield gas proximate to the delivered wire.

8. The apparatus set forth in claim 1 also comprising a laser beam delivery robot to which the mount is attached.

9. The apparatus set forth in claim 8 also comprising a control unit for controlling the laser delivery robot and also comprising a motorized wire feeder responsive to the control unit.

10. The apparatus set forth in claim 9 also comprising a laser beam generator responsive to the control unit.

11. An apparatus for use with a laser beam delivery system comprising:
    a mount attached to the laser beam delivery system;
    a cylinder attached to the mount;
    a piston having first and second piston ends and a piston body sealingly and slidably engaged with the cylinder dividing the cylinder into first and second piston chambers, the piston slidable between an extended position and a retracted position and having an axial bore through which a supplemental wire is fed;
    a wire supply operatively associated with the first piston end to supply the supplemental wire to the first piston end, through the piston and to the second piston end; and
    a delivery head attached to the second piston end for delivery of the supplemental wire proximate to a laser beam and a work-piece.

12. The apparatus set forth in claim 11, also comprising:
    a spring mounted within the first piston chamber operatively associated with the cylinder and the piston body, biasing the piston in the extended position;

means for providing a shield gas to the first piston chamber; and means for controllably providing pressurized air to the second piston chamber, so that when the pressurized air enters the second piston chamber, the piston slides into the retracted position.

13. The apparatus set forth in claim 12, wherein the piston has a transversal bore in the first piston chamber providing a flow path for the shield gas from the first piston chamber to the axial bore, wherein the axial bore and delivery head provide a flow path for the shield gas, through which the shield gas is delivered proximate to the laser beam and the work piece.

14. An apparatus comprising, in combination, a laser beam delivery device providing a laser beam to a work piece and a retractable wire delivery unit mounted to the laser beam delivery device, the retractable wire delivery unit having a first operational state in which the wire delivery unit is extended to provide a wire in a vicinity of the laser beam proximate to the work piece and having a second operational state in which the wire delivery unit is retracted, removing the wire from the vicinity of the laser beam.

15. A method for welding metal parts between which there is a gap, comprising the steps of:

placing two metal parts in proximity of each other so that one of the metal parts has a facing away surface facing away from the other metal part;

positioning a robot with a laser delivery head and a wirefeed head to a weld start position;

starting delivery of a laser beam so that the laser beam is applied to the facing away surface;

supplying supplemental wire through the wirefeed head at an intersection between the laser beam and the facing away surface;

moving the robot along a weld path;

stopping the supply of supplemental wire;

retracting the wirefeed head; and stopping delivery of the laser beam.

16. The method of claim 15, wherein the two metal parts are placed so that a gap exists between the two metal parts along at least a portion of the weld path.

17. The method of claim 15, wherein the two metal parts comprise part of a stack-up, the stack-up including at least three metal parts that are welded by the laser beam.

18. The method of claim 15, wherein the two metal parts comprise part of a stack-up, the stack-up including at least four metal parts that are welded by the laser beam.

* * * * *